United States Patent [19]

Lordi et al.

[11] 4,336,354
[45] Jun. 22, 1982

[54] METHOD OF PREPARING STYRENE-MALEIC ANHYDRIDE MOLDING COMPOSITION

[75] Inventors: Frank E. Lordi; Jacob Triplett, both of West Chester, Pa.

[73] Assignee: Atlantic Richfield Company, Los Angeles, Calif.

[21] Appl. No.: 247,690

[22] Filed: Mar. 26, 1981

[51] Int. Cl.$^3$ .......................................... C08F 279/02
[52] U.S. Cl. ..................................... 525/301; 525/285
[58] Field of Search ................... 525/74, 78, 285, 301

[56] References Cited

U.S. PATENT DOCUMENTS

| | | | |
|---|---|---|---|
| 4,097,551 | 6/1978 | DiGiulio | 525/301 |
| 4,221,880 | 9/1980 | Fava | 525/285 |
| 4,223,096 | 9/1980 | Lee | 525/78 |

*Primary Examiner*—Paul R. Michl

[57] ABSTRACT

A molding composition having advantageous toughness and impact resistance is prepared by polymerizing a mixture of styrene and maleic anhydride in the presence of and adapted to incorporate from about 5 to about 25% of a high impact polystyrene containing from about 4 to about 16% rubber, said high impact polystyrene having an average molecular weight which is significantly higher than the average molecular weight of the completed molding composition. The composition is especially useful in molding fiber-reinforced articles. The composition has outstanding toughness when green. That is, hot and freshly molded articles can be removed from the mold with minimized breakage, thus decreasing the amount of scrap arising from the breakage of a green molded item at the time of being ejected and/or removed from a mold. Moreover, the composition is moldable throughout a wide range of conditions and is less sensitive to changes in molding conditions.

1 Claim, No Drawings

METHOD OF PREPARING STYRENE-MALEIC ANHYDRIDE MOLDING COMPOSITION

RELATED APPLICATION

Reference is made to the application of F. E. Lordi and P. S. Francis Ser. No. 247,689 filed Mar. 26, 1981, pending, concerned with a Blend of Styrene-Maleic Anydride and High Impact Polystyrene, all the disclosure of which is deemed here reiterated and incorporated herein.

FIELD OF INVENTION

This invention relates to molding compositions having advantageous toughness for minimizing the amount of breakage of green, freshly molded articles at the time of their removal from a mold, and to a method of polymerizing a reaction mixture to achieve such molding composition.

PRIOR ART

When an article is molded, the macromolecular organic structural material must be placed in the molding machine, and subjected to appropriate heat and pressure to cause the flowing of the plastic material into all portions of the mold. The molding process necessarily involves a cooling time subsequent to the filling of the mold and prior to the removal of the green article from the mold. The term "green" is applied to the freshly molded article to distinguish it from the article subsequent to adequate cooling to ambient temperature and/or the other transformations attributable to adequate aging at ambient temperature of the molded article. It has long been known that the green strength of a molded article was less than that of the article after adequate aging at ambient temperature. The cycle of cooling within the mold is desirably controlled for a time sufficient that most of the articles develop sufficient green strength to be withstanding the strains of removal from the mold and/or storage during the time that the green article is awaiting the next step in the manufacturing operation.

The likelihood of articles being broken when being removed from a mold has been affected by the shape of the article, the shape of the mold, and the extent to which the article tends to cling to the mold because of the absence, in appropriate portions of the mold, of adequate tapering relative to the direction of withdrawal of the molded article. There is a greater likelihood of breakage if the green article has a propensity to grip the uniform dimensions of cylindrical protrusions as distinguished from the ease of withdrawing from a conical surface.

Some molded articles contain a controlled amount of inorganic fibers such as metal fibers or glass fibers, which reinforce the article of organic structural material. Such fiber reinforced articles can have greater toughness, advantageous impact resistance, and superior heat resistance attributable to such fiber reinforcement. The propensity for breakage of green articles containing glass fiber is oftentimes greater than for articles lacking such reinforcements, inasmuch as the presence of the glass fibers tends to minimize the elasticity of the green article while it is in being pulled away from the mold. The green strength of a glass fiber-reinforced article tends to be less and the scrap rate attributable to breakage of the green article tends to be greater than for an article lacking glass fibers.

Resins featuring styrene-maleic anhydride are employed in lieu of other resins in part by reason of their propensity to withstand higher use temperatures without tendencies toward warping, softening or melting, and in part because such resins have a cost advantage among high heat resistant resins.

High impact polystyrenes (HIPS) contain measurable amounts, such as 4% to 16%, preferably 6% to 10%, of rubber grafted as blocks onto the styrene chains. HIPS are distinguished particularly by having a higher molecular weight than some typical styrene-maleic anhydride resins. A process of exhaustive polymerization of suspended beads is among the routes which may lead to HIPS. The molecular weight of the HIPS must be more than 20% higher than the molecular weight of the final polymerization styrene-maleic anhydride resin. The presence of such high molecular weight of the HIPS is believed to impart a toughness to the composition of the green article. The grafted rubber component of the HIPS might also have a contributing influence in maintaining some degree of elasticity within the freshly formed green article at the time that it is being removed from a mold. However, the composition of the present invention functions far better than using styrene-maleic anhydride resins containing larger amounts of rubber, thus indicating that the improved green strength is not attributable merely to rubber content and possibly is attributable to the high molecular weight.

Moore et al U.S. Pat. No. 3,919,354 describes the preparation of a molding composition from polymerization of a solution of both rubber and maleic anhydride in styrene, the MA being injected at a rate less than the rate of polymerization of the styrene.

The search has been going on over a very long period of time for a molding composition having an appropriate conbination of properties permitting its use in molding articles with a minimized breakage of the freshly molded articles when the cooling cycle is maintained at a rate that is fast enough to be of commercial operability. Notwithstanding the continued effort to seek for appropriate molding compositions, prior technologists were not able to solve the problem of providing at an appropriate cost a molding composition having the advantages of high heat stability for the ultimately used article, and excellent toughness in the green condition whereby the articles can be molded with a minimized breakage of the green articles.

SUMMARY OF THE INVENTION

In accordance with the present invention, a molding composition is prepared by polymerizing a solution of a high impact polyvinyl aromatic compound having an average molecular weight at least 20% greater than that of the molding composition, said solution containing a controlled amount of an unsaturated dicarboxylic acid moity, said solution consisting predominantly of monomeric vinyl aromatic compound as solvent, devolatilizing the thus formed interpolymer, and shaping the devolatilized interpolymer into particles of molding composition, said composition consisting of from about 5 to 15% maleic anhydride, from about 5 to about 25% of said high impact polyvinyl aromatic compound having a molecular weight at least 20% greater than the molecular weight of said molding composition, said high impact polyvinyl aromatic compound containing from about 4 to 16% rubber.

The nature of the invention is further clarified by reference to a plurality of examples:

EXAMPLE A

A high impact polystyrene bead was prepared by suspension polymerization. Butadiene was polymerized into an elastomer having properties generally competitive with natural rubber. One brand of synthetic rubber useful in the present invention is designated as Diene 35. The rubber was dispersed in monomeric styrene, providing a solution of about 8% rubber, which solution had a sufficiently low viscosity to permit easy mix. A concentration of 0.01% benzoyl peroxide was added as polymerization catalyst, and the system stirred and heated for about thirty minutes to achieve a controlled amount of polymerization of the styrene and to provide a solution containing about 20% of a polymer dissolved in 80% monomeric styrene. At this stage of the polymerization, water and suspending agent are introduced with agitation to provide a system in which the styrene solution (containing about 20% polymer) is dispersed as globules suspended in the agitated aqueous system. Additional benzoyl peroxide is also added to the system, so that when the system is reheated, the polymerization reaction is promoted at a relatively rapid rate, thereby converting the system fairly quickly to an aqueous suspension of rubber-entrained polystyrene beads, which beads contain residual monomer. The final stage of polymerization, and the conversion of the product to high impact polystyrene having a molecular weight of at least 300,000 is accomplished by heating the aqueous suspension at 130° C. at superatomspheric pressure for 2 hours. The product is cooled, the aqueous fraction separated from the beads, and the beads washed and dried.

EXAMPLE B

A procedure generally following Example A is followed, except that the amount of rubber incorporated is 16% and the choice of rubber is a natural rubber coagulated from natural latex, and the molecular weight of the high impact polystyrene is enhanced by final polymerization at 125° C. for 3 hours.

EXAMPLE C

A procedure generally following Example A is followed, except that only 4% rubber is included in the styrene, and the final polymerization is conducted for 2.5 hours at 120° C.

EXAMPLE D

An instrument panel insert designed to hold instruments for an automobile is prepared by injection molding. The molding composition is a heat-resistant plastic containing about 88% styrene, 8% maleic anhydride, and 4% rubber, modified by the inclusion of 20% glass fibers. When the panels are molded with a long (more than two minutes) cooling cycle, so that the freshly molded article is thoroughly cooled prior to removal from the mold, there is no troublesome breakage of the panels during their removal from the mold. However, when the panels are removed from the molds after the cooling cycle which is appropriate for glass fiber-containing articles, there is a troublesome amount of breakage of the "green" (i.e. not fully cooled or ripened) articles. Profitable use of the injection molding machine requires molding articles fast enough (i.e. with approximately conventional cooling intervals) that the manpower and capital investment can be efficiently utilized. Such frequent breakage upon removal from the mold during conventional cooling cycles but trivial breakage when operating with very long cooling periods supports a diagnosis of deficient green strength. It should be noted that inadequate green strength has no correlation with measurements (e.g. crushing strength, tensile strength, etc.) on the finished product or on the moldable composition per se.

EXAMPLE 1

A styrene solution is modified by the addition of the high impact polystyrene of Example B, and further modified by the injection of a solution of maleic anhydride in styrene, said solution also containing benzoyl peroxide catalyst. The copolymer of styrene and maleic hydride entrains high impact polystyrene micelles. After 30 minutes polymerization at 120° C., the system was cooled and transferred to a volatilizing extruder. Styrene is volatilized permitting extrusion of an interpolymer composition containing about 8% maleic anhydride about 20% high impact polystyrene and 72% styrene. The thus prepared styrene-maleic anhydride resin is mixed with 20% glass fibers and molded into panels in an injection molding machine using a conventional cooling cycle. The panels have substantially all of the desirable end use properties of the slowly produced panels of Example D. Of particular importance, the breakage rate in removal from the mold in trivial when operating at rapid production rates. The presence of the high impact polystyrene in the molding composition improves the green strength. The presence or absence of the dissolved high impact polystyrene in the styrene monomer is established as the critical factor determining the presence or absence of acceptable green strength when the panels are produced at a rapid rate meeting commercial standards.

EXAMPLE 2

A polymerization autoclave having mixing blades, heat transfer jackets, and related auxiliaries is partially filled with 500 pounds of monomeric styrene, followed by the addition of 52 pounds of a solution containing 15% Stereon 720 rubber dissolved in styrene. For molding composition usage a rubber prepared by copolymerization of 72% butadiene and 28% styrene using sec Bu Li as catalyst is equivalent to Stereon 720, which is believed to fit such description. The mixture also contains a trinonyl phosphite anti-oxidant, a phenolic anti-oxidant, and benzoyl peroxide, each in minor amounts. The mixture is heated to 70° C. to initiate polymerization. Then the reactant mixture is modified by the injection of a solution of maleic anhydride at a rate slower than the rate of polymerization, whereby the maleic anhydride units are adequately spaced from each other along the chain instead of following a propensity to form alternate styrene and maleic anhydride units along the chain. About 150 pounds of a mixture of about 30 pounds of maleic anhydride and 12 pounds of styrene are thus injected into the reaction mixture during the polymerization, which is carefully controlled to be incomplete, providing a significant amount of styrene as solvent. The solution of polymerized product is transferred to a devolatilizing extruder operated at 45–50 mm pressure, thus removing monomer from the molding composition. The thus prepared molding consist essentially of:

| | |
|---|---|
| styrene | 78 |
| maleic anhydride | 8 |
| high impact polystyrene | 10 |
| rubber | 4 |

Pellets of the thus prepared molding composition were molded into test specimens to determine their usefulness.

| | |
|---|---|
| tensile strength | 7000 psi |
| elongation | 4.2% |
| flexural strength | 12,800 psi |
| flex modulus | 433,000 psi |
| Izod impact, notched | 0.9 ft lb/in |
| deflection T under load | 194° F. |
| melt flow at 230° C. condition L | 1.4 |
| Vicat | 118° C. |

By mixing said pellets with glass fibers so that the molded specimens were glass fiber reinforced, the measurements were:

| | |
|---|---|
| tensile | 11,000 psi |
| elongation | 1.5% |
| flexural strength | 20,000 psi |
| flexural modulus | 878,000 psi |
| Izod impact, notched | 2.8 ft lb/in |
| deflection T under load ⅛" specimen, 264 psi | 230° F. |

Of particular importance, the strength of the "green" article freshly removed from the mold after the short cooling interval was quite satisfactory, thus contrasting greatly from the corresponding articles lacking the 10% high impact polystyrene.

EXAMPLE 3

The procedure of Example 3 was followed, except for the styrene solution contained 48 (instead of 39) pounds of high impact polystyrene. After devolatilization in the extruder, the molding composition contained about 15% by weight of the HIPS. Measurements on the resulting specimens of molded articles, with and without fiber glass reinforcement showed:

| | 15% HIPS | |
|---|---|---|
| | plain | with 20% fiber glass |
| tensile psi | 6700 | 10,400 |
| elongation % | 5.9 | 1.6 |
| flex str psi | 12,800 | 18,300 |
| flex modulus | 439,000 | 850,000 |
| Izod, notched, ft lb/in | 0.9 | 2.9 |
| deflection T under load °F. | 199 | 235 |
| Vicat °C. | 120 | NA |
| melt flow-Cond L | 3.6 | NA |

Using cooling intervals equivalent to rapid production, the green strength was commercially satisfactory for each composition, thus contrasting with the weakness of green articles prepared without including the HIPS in the starting mixture.

EXAMPLE 4

The procedures of Examples 2 and 3 were followed, except that the styrene contained 66 pounds of high impact polystyrene prepared by exhaustive polymerization of a mixture providing 16% butadiene component in the HIPS. The molding composition contained 20% HIPS. Data relating to the molded articles are:

| | 20% HIPS | |
|---|---|---|
| | without fiber | with 20% fiber |
| tensile | 6200 | 10,300 |
| elongation % | 11.1 | 1.6 |
| flex strength psi | 12,100 | 17,500 |
| flex modulus psi | 428,000 | 831,000 |
| notched Izod ft lb/in | 0.9 | 2.8 |
| deflection T under load | 191 | 233 |
| melt flow Cond L | 1.0 | NA |
| Vicat °C. | 121 | NA |

The freshly molded articles were sufficiently rugged after a cooling interval corresponding to rapid production and thus were distinguished from similar compositions lacking the HIPS component.

EXAMPLE 5

The procedures of Example 4 were followed, except that no rubber was dissolved in the styrene and all of the rubber present was a part of the high impact polystyrene. The articles were molded using a cooling cycle corresponding to rapid production, and shown to be significantly superior, particularly as regards green strength to corresponding articles lacking the HIPS in the initial styrene solution. Data relating to the articles, with and without glass fiber reinforcement, include:

| | 20% HIPS (no other rubber) | |
|---|---|---|
| | without | with glass fiber |
| tensile, psi | 6900 | 10,800 |
| elongation % | 4.2 | 1.4 |
| flex strength psi | 12,800 | 18,200 |
| flex modulus psi | 441,000 | 836,000 |
| notched Izod ft lb/in | 0.8 | 2.8 |
| deflection T °F. | 200 | 235 |
| melt flow Cond L | 1.0 | NA |

Supplemental data also establish that the green strength of the rapidly produced articles derived from the monomeric mixture containing HIPS was quite superior to the green strength of the articles in which the HIPS was lacking from the monomeric mixture.

An important supplemental advantage of the molding compositions concerns their wide range of flow characteristics. For any macromolecular structural material employed in injection molding, there is a range of temperatures above which satisfactory molding is not possible and below which the viscosity is too great to permit satisfactory molding. Although interpolymer molding compositions featuring styrene and maleic anhydride have been described in patents over a long period of time, they have not been used in the quantities comparable to many other varieties of molding compositions. Some factory managers have been reluctant to use some less expensive varieties of styrene-maleic anhydride molding compositions because the temperature range for convenient molding was troublesomely narrow. For example, using certain styrene-maleic anhydride pellets in certain injection molding machines, it was found that reliable production required maintenance of the temperature at + or −10° F. of the optimum temperature. Molding within such 20° F. range was enough of a problem in some factories to restrict the market for such molding composition. The molding compositions of the present invention can sometimes be molded satisfactorily throughout a 50° F. range, and assuredly throughout a 30° F. range. The adaptability of the molding composition to a wider range of molding conditions opens up a larger potential market for the molding composition of the present invention.

Molding compositions containing significant amounts of fiber reinforcements particularly need an adequately wide range of molding temperatures. The molding compositions of the present invention have proven to be useful for making fiber reinforced articles.

By a series of tests it was established that the method of preparing a useful molding composition should include the steps of polymerizing to form an interpolymer liquid system featuring a monomeric vinyl aromatic compound as as solvent, a minor concentration of an unsaturated dicarboxylic acid moiety, said liquid system containing from 5 to 25 weight % of a high impact polystyrene having a molecular weight at least 20% greater than the final thermoplastic composition product, said high impact polystyrene consisting essentially of from 4 to 16% alkadiene and 84 to 96% styrene, the polymerization conditions being so controlled that the interpolymer contains both (a) from 5 to 15 weight % moiety of unsaturated dicarboxylic acid, and (b) from 5 to 25 weight % of said high impact polystyrene; devolatilizing the thus formed interpolymer to remove substantially all of said monomeric vinyl aromatic compound to provide an interpolymer derived predominantly from vinyl aromatic compound and comprising both (a) from 5 to 15 weight % moiety of unsaturated dicarboxylic acid, and (b) from 5 to 25 weight % of said high impact polystyrene; and shaping said devolatilized interpolymer into particles of thermoplastic composition, said composition consisting of the interpolymer of 5 to 15% moiety of unsaturated dicarboxylic acid, 5 to 25% high impact polystyrene, and the balance vinyl aromatic compound.

Various modifications are possible without departing from the scope of the appended claims.

The invention claimed is:

1. The method of making a thermoplastic composition useful in molding, extrusion, thermoforming, and the like which method comprises:

separately preparing a high impact polystyrene by copolymerizing alkadiene and a monomeric vinyl aromatic compound to provide a high impact polystyrene consisting essentially of from 4 to 16% alkadiene and 84 to 96% styrene, the molecular weight of said high impact polystyrene being at least 20% greater than the molecular weight of the hereinafter designated thermoplastic composition product;

preparing a solution of said high impact polystyrene in monomeric vinyl aromatic compound as a solvent and using said solution in the hereafter designated liquid system;

polymerizing to form an interpolymer in a liquid system featuring a monomeric vinyl aromatic compound as a solvent, a minor concentration of an unsaturated dicarboxylic acid moiety, said liquid system containing from 5 to 25 weight % of said high impact polystyrene, the polymerization conditions being so controlled that the interpolymer contains both (a) from 5 to 15 weight % moiety of unsaturated dicarboxylic acid, and (b) from 5 to 25 weight % of said high impact polystyrene;

devolatilizing the thus formed interpolymer to remove substantially all of said monomeric vinyl aromatic compound to provide an interpolymer a thermoplastic composition product derived predominantly from vinyl aromatic compound and comprising both (a) from 5 to 15 weight % moiety of unsaturated dicarboxylic acid, and (b) from 5 to 25 weight % of said high impact polystyrene; and shaping said devolatilized interpolymer into particles of thermoplastic composition, said composition consisting of the interpolymer of 5 to 15% moiety of unsaturated dicarboxylic acid, 5 to 25% high impact polystyrene, and the balance vinyl aromatic compound.

* * * * *